May 24, 1966 A. P. MORREALE 3,253,127
DIGITAL READOUT AND DRIVE MEANS THEREFOR
Filed July 14, 1961
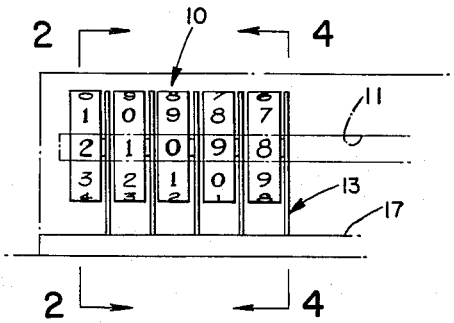
FIG. 1.
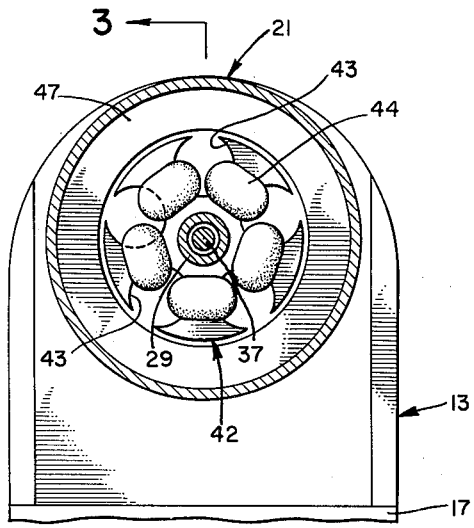
FIG. 2.
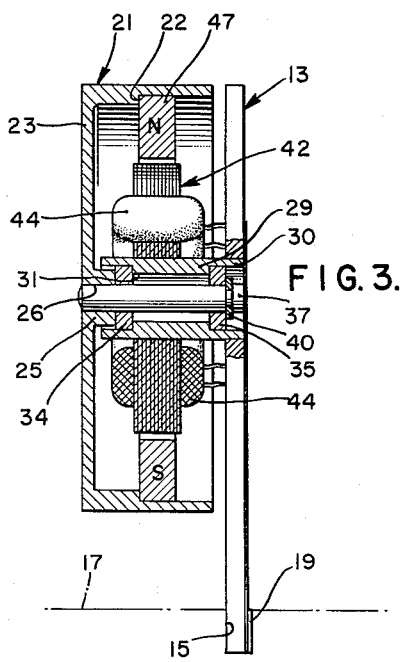
FIG. 3.
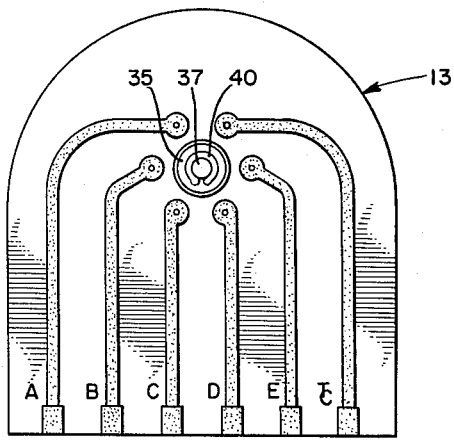
FIG. 4.
| 6 WIRE SYSTEM | | |
|---|---|---|
| POS. | B+ ON | B- ON |
| 1 | A | Ē |
| 2 | Ē | D |
| 3 | B | C̄ |
| 4 | C̄ | E |
| 5 | C | Ē |
| 6 | Ē | A |
| 7 | D | Ā |
| 8 | Ā | B |
| 9 | E | B̄ |
| 0 | D̄ | C |
FIG. 5.
ANTHONY P. MORREALE
INVENTOR.
BY
ATTORNEY.

United States Patent Office 3,253,127
Patented May 24, 1966

3,253,127
DIGITAL READOUT AND DRIVE MEANS THEREFOR
Anthony P. Morreale, 9908 Lampson St., Whittier, Calif.
Filed July 14, 1961, Ser. No. 124,100
2 Claims. (Cl. 235—61.11)

This invention relates to a novel and improved digital readout device, and novel and improved drive means therefor. The drive means preferably takes the form of a stepper motor of novel and improved construction and which has adaptations in environments other than that of a digital readout as well.

In the exemplary form of the invention disclosed in detail herein, the digital readout device takes the form of one or a plurality of digit wheels with an individual drive means for each wheel. Each drive means may be separately energized from a source of electrical pulses to position its respective digit wheel to readout a particular digit. In the exemplary form of the invention, the drive means is in the form of a stepper motor of particular construction which is especially adaptable for driving the readout device as will be explained in detail hereinafter. In the motor the armature or rotor is attached inside of the digit wheel and these elements rotate together around the stator which is on a central shaft. The rotor takes a fixed digital position in response to individual electrical pulses of either polarity applied to stator windings as will be explained.

Preferably, each stepper motor or driving unit is mounted on an individual printed circuit board having circuits leading to the stator windings.

The primary object of the invention is to provide an improved digital readout device comprising a plurality of digit wheels, each having separate drive means, which are separately energizable whereby each digit wheel can be individually positioned to read any particular digit.

Another object is to provide novel and improved individual drive means for individual digit wheels in the form of an electrical stepper motor mounted within the digit wheel.

Another object is to provide a stepper motor as in the foregoing object, wherein the motor comprises a stator on a central shaft with an armature rotor carrying a digit wheel rotating around the stator.

Another object is to provide an assembly as in the foregoing, comprising a plurality of stepper motors and digit wheels each mounted on a printed circuit board having circuits leading to the stator windings, the circuit boards being mountable on a base.

Another object is to provide an improved stepper motor comprising a stator mounted on a shaft, and having angularly spaced axial openings with windings wound on the radial parts of the stator between the openings.

Another object is to provide a stepper motor as in the foregoing objects wherein the armature rotor is of the permanent magnet type having a discrete position for each energization whether positive or negative of each individual stator winding.

Further objects and additional advantages of the invention will become apparent from the following detailed description, claims and annexed drawings wherein:

FIG. 1 is a view of a plurality of the digital readout wheels of the invention coaxially assembled;

FIG. 2 is a view taken along the line 2—2 of FIG. 1;

FIG. 3 is a sectional view taken along the line 3—3 of FIG. 2;

FIG. 4 is a view taken along the line 4—4 of FIG. 1;

FIG. 5 is a chart illustrating the positions of a digit wheel corresponding to electrical connections between circuits shown in FIG. 4.

Referring now more in detail to the various figures of the drawings, FIG. 1 shows a plurality of digit wheels indicated generally by the numeral 10 coaxially mounted. The digit wheels may, of course, be behind a mask having an opening in it, as shown at 11, so that only one digit is seen at a time on each wheel. These digit wheels have an external appearance which is conventional in the art. Each digit wheel has its own driving means on the inside thereof forming a unit or assembly, which assembly is mounted on a panel in the form of a printed circuit board, as designated at 13. FIGS. 3 and 4 are enlarged views showing the individual circuit board more in detail. The circuit boards may be mounted in slots as designated at 15 in a base member 17. The printed circuit board has printed circuits or circuitry thereon as indicated by the letters. When a circuit board is mounted, the printed circuitry comes into contact with electrical contacts or terminals as designated at 19 provided within the slots 15. Appropriate electrical connections can be made to the contactors 19.

The driving means for each of the digit wheels is in the form of an electrical stepper motor and one of these motors is shown more in detail in FIGS. 2 and 3. Numeral 21 designates an individual digit wheel. This wheel is in the form of a cylinder as shown which has an internal shoulder 22 formed by a counter-bore. The wheel may be said to be cup-shaped having a flat face or bottom 23, having an inwardly extending central boss 25 having a bore 26. The digit wheel, as so far described, may be of a size and construction as conventional in the art. Each digit wheel, as shown in FIG. 1, has ten equally spaced digits thereon from zero to nine.

Numeral 29 designates a cylinder or sleeve mounted in an opening 30 in the printed circuit board 13. This sleeve has a bore 31 and a counter-bore at each end. In the counter-bore are bushings 34 and 35, and mounted in these bushings is a shaft 37, one end of which fits into the bore 26 in the boss 25. The bushings 34 and 35 are in the form of bearings for the shaft 37 or the digit wheel may rotate on the end of the shaft with the shaft being non-rotatable. The sleeve 29 does not rotate. The shaft 37 may be held by a snap-ring 40 held in a groove in the shaft 37.

The stator of the stepper motor is designated at 42. It is mounted on the sleeve 29. The stator is of laminated construction and it has in it a plurality of circular bores or openings 43, which are equally angularly spaced as may be seen in FIG. 2. The windings 44 of the stator are wound on the parts of the stator between the openings 43. The heads of the windings or coils are small, having a relatively small axial extent beyond the faces of the stator 42. In the form of the invention shown, there are five (5) stator coils. There is a separate circuit or electrical connection to each of the coils and one circuit or electrical connection common to all of them as is indicated in FIG. 4.

The armature or rotor is designated at 47. In the form of the invention shown, it is simply a permanent magnet type rotor of ring shape made of suitable material. It fits inside of the digit wheel 21 in the counterbore thereof engaging against the annular shoulder 22 as shown. In other words, the rotor or armature and digit wheel rotate together around the stator.

The polarization of the rotor or armature interacts with the stator windings so that the rotor and digit wheel have a discrete position for each individual energization whether positive or negative of each individual winding. The windings are energizable individually from any suitable source which may be a manual source or a source of pulses to which the device is to respond. In other words, the coils of the stator winding are individually energized by incoming electrical pulses and the digit wheel assumes a corresponding position to readout an individual digit. There being five coils, there are ten discrete positions, there being separate positions as stated for positive and negative energizations of each coil. The chart FIG. 5 illustrates the connections to be made between leads as designated in FIG. 4, and the polarities to be applied to establish the ten discrete positions.

From the foregoing description of operation, it will be apparent to those skilled in the art that each digit wheel may be operated in steps from one digit to the next consecutive digit by applying energization or pulses to appropriate circuit leads. On the other hand, each digit wheel can be positioned to readout any particular digit, whether in regular sequence or not, simply by energizing the appropriate circuit leads for that digit wheel position. Each digit wheel and its stepper motor is adaptable for use individually, if desired, or in assemblies or multiples coaxially mounted as shown in FIG. 1.

The stepper motor, as described herein, may, of course, be utilized in other adaptations and environments and may be utilized in any application where stepping movement and/or discrete positions in response to electrical energizations are desired. The stepper motor may, of course, be physically mounted in other ways than that illustrated in detail herein. In other than digital or counting applications, it might be desired to have numbers of stator windings other than five. The precise shape of the stator might be varied within the scope of the invention.

From the foregoing, those skilled in the art will observe that the invention achieves and realizes all of the objects and advantages outlined in the foregoing and as are apparent from the detailed description. Additionally, it may be said that the invention has the advantage that the windings are on the outside of stator laminations which makes for low cost production. The coil heads are small, not occupying very great space outside of the actual openings in the stator. The motor has high torque because it is naturally larger being on the outside of the stator.

The foregoing disclosure is representative of a preferred form of the invention and is to be interpreted as an illustrative rather than a limiting sense, the invention to be accorded the full scope of the claims appended hereto.

What is claimed is:

1. In a digital readout device, a stator member and a rotor member rotatable about a fixed axis located centrally of said stator member, an odd number of pole elements on one of said members and directed radially therefrom toward the other member and in equally angular spaced relation, a coil wound about each pole element, permanent magnet means on said other member with its opposite magnetic poles on diametrically opposite sides of said axis and adjacent the ends of said pole elements, and means for conducting unidirectional current through any selected coil, in either direction therethrough, the outer periphery of said rotor being provided with equally spaced indicia characters thereon, there being twice as many characters as there are pole elements on said one member.

2. In a digital readout device, a stator having five pole elements directed radially of a fixed axis in equal angularly spaced relation about said axis, a coil wound about each pole element, a rotor mounted for rotation about said axis and having permanent magnet means fixed thereon with its opposite magnetic poles arranged on diametrically opposite sides of said axis, said magnetic poles being radially outwardly of but adjacent the outer ends of said pole elements, and means for conducting unidirectional current through any selected coil, in either direction therethrough, the outer periphery of said rotor being provided with ten equally spaced indicia comprising the numerals 0 through 9.

References Cited by the Examiner
UNITED STATES PATENTS

| 2,241,548 | 5/1941 | Frischknecht | 235—61 |
| 2,344,254 | 3/1944 | Leathers et al. | 235—92 |
| 2,855,149 | 10/1958 | Bickford et al. | 235—92 |

FOREIGN PATENTS 866,311  4/1961  Great Britain.

ROBERT C. BAILEY, *Primary Examiner.*

WALTER W. BURNS, Jr., MALCOLM A. MORRISON, *Examiners.*

D. M. ROSEN, G. D. SHAW, *Assistant Examiners.*